United States Patent
Ledbetter et al.

(10) Patent No.: US 8,325,078 B1
(45) Date of Patent: Dec. 4, 2012

(54) REMOTE SWITCH OPERATOR CONTROLLER

(76) Inventors: Finley Lee Ledbetter, Argyle, TX (US); Ashley Ledbetter, Argyle, TX (US)

( * ) Notice: Subject to any disclaimer, the term of this patent is extended or adjusted under 35 U.S.C. 154(b) by 488 days.

(21) Appl. No.: 12/698,824

(22) Filed: Feb. 2, 2010

Related U.S. Application Data

(63) Continuation-in-part of application No. 12/538,299, filed on Aug. 10, 2009, now Pat. No. 8,228,225.

(51) Int. Cl.
*H04L 29/00* (2006.01)
*H01H 9/00* (2006.01)
*H02B 11/12* (2006.01)

(52) U.S. Cl. .............. 341/176; 200/50.24; 361/641

(58) Field of Classification Search .............. 341/176; 200/50.21, 50.24; 361/600, 641
See application file for complete search history.

(56) References Cited

U.S. PATENT DOCUMENTS

| | | | |
|---|---|---|---|
| 5,477,017 A | 12/1995 | Swindler et al. | |
| 6,777,627 B1 | 8/2004 | Stevenson | |
| 6,897,388 B2 | 5/2005 | Greer | |
| 6,951,990 B1 | 10/2005 | Miller | |
| 7,019,230 B1 | 3/2006 | Vaill et al. | |
| 7,825,344 B2 * | 11/2010 | Stevenson | 200/50.24 |
| 8,063,323 B1 * | 11/2011 | Ledbetter | 200/50.21 |
| 8,151,452 B2 * | 4/2012 | Ledbetter | 29/756 |
| 8,161,631 B1 * | 4/2012 | Ledbetter et al. | 29/762 |
| 2009/0014291 A1 * | 1/2009 | Stevenson | 200/50.24 |
| 2011/0062002 A1 * | 3/2011 | Hawkins et al. | 200/50.24 |
| 2011/0192707 A1 * | 8/2011 | Sorensen | 200/50.25 |
| 2012/0024677 A1 * | 2/2012 | Safreed et al. | 200/50.24 |
| 2012/0055765 A1 * | 3/2012 | Zylstra et al. | 200/50.24 |

* cited by examiner

*Primary Examiner* — Howard Williams
(74) *Attorney, Agent, or Firm* — Gardere Wynne Sewell LLP

(57) ABSTRACT

A controller for remotely controlling an installer/remover of electrical equipment with a body connected to a lid, two L-shaped opposing face plates in the body, a battery beneath a first face plate along with a timer circuit board and a plurality of relays. The controller can include a circuit breaker, a power on/off switch for energizing the timer circuit board, a plug for providing current, a plug with transmission means to provide power and control signals to the installer/remover of electrical equipment, a remove momentary push button, and an install/momentary push button. The controller can also include a current controller.

20 Claims, 3 Drawing Sheets

REMOTE SWITCH OPERATOR CONTROLLER

CROSS REFERENCE TO RELATED APPLICATIONS

The present application is a continuation-in-part of co-pending U.S. patent application Ser. No. 12/538,299 filed on Aug. 10, 2009, entitled "REMOTE SWITCH OPERATOR". This reference is incorporated herein in its entirety.

FIELD

The present embodiments generally relate to a controller that provides control signals and power to a device that installs and/or removes electrical equipment subject to flash arcing. Flash arcing can provide second and third degree burns to a worker.

BACKGROUND

A need exists for a removable and modular power controller for use with devices that install and/or remove electrical equipment that can be remotely operated, preventing users from experiencing second or third degree burns.

A need exists for a controller that can be used when removing circuit control boards, circuit breakers, or other circuit panels that utilize high voltages.

A need exists for a controller that can be used, for example, in a hotel equipment room or a hospital, and can operate without the need to shut the power supply off.

Shutting the power supply off in a hospital can cause injury to a patient in an intensive care unit of the hospital, as they often rely on electrically powered equipment to maintain their lives A need exists for a controller usable with a racking tool that can insert or remove circuit breakers without the need for a human to touch the circuit breaker or any other related type of electrical equipment while voltage is passing through the electrical panel associated with the electrical equipment.

The present embodiments meet these needs.

BRIEF DESCRIPTION OF THE DRAWINGS

The detailed description will be better understood in conjunction with the accompanying drawings as follows.

Figure 1:
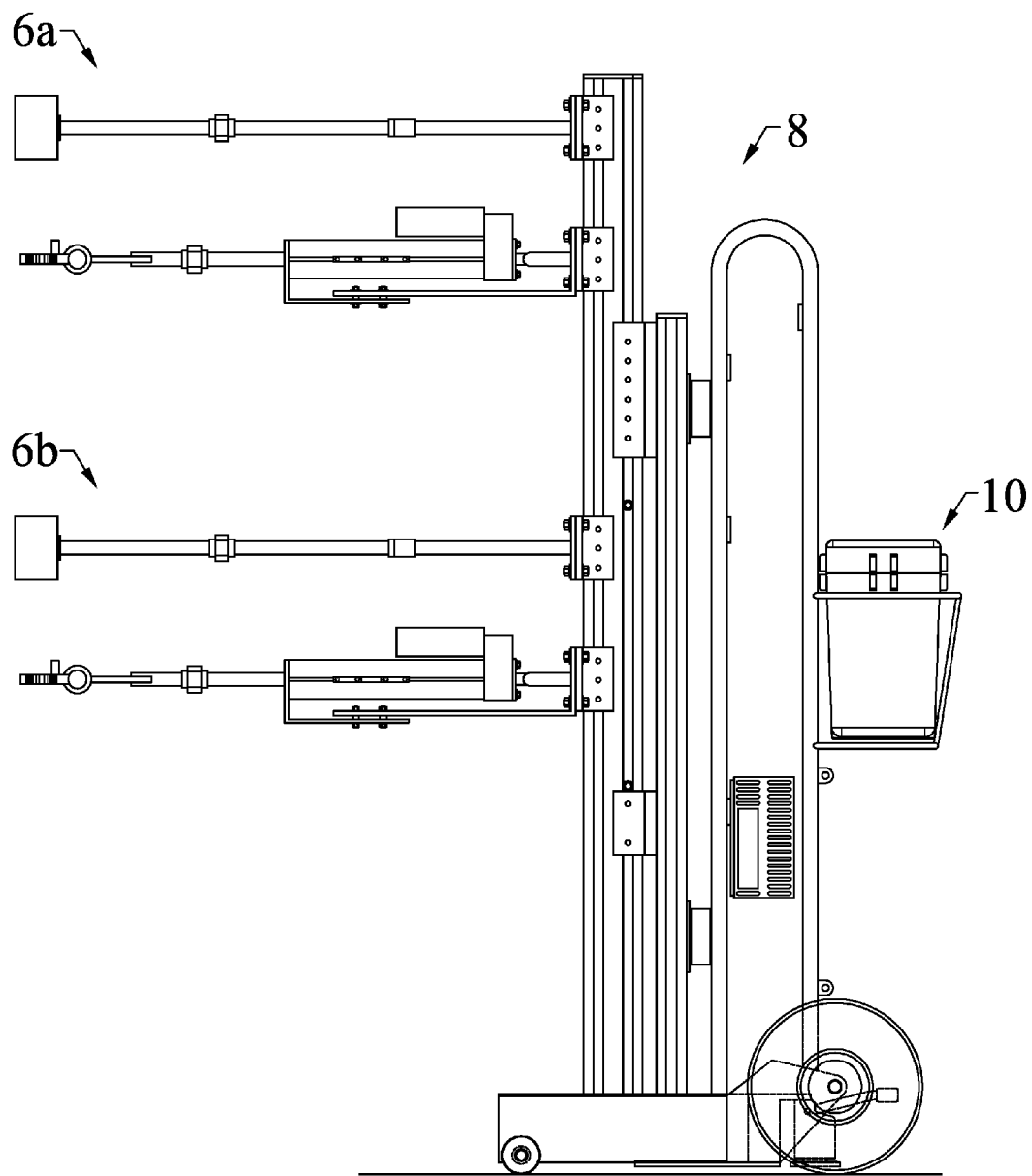
FIG. 1 is a side view of a remote switch operator controller mounted on an installer/remover frame.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments relate to a controller, which is also termed "a remote switch operator" or "RSO" that can function as a controller for at least one remote controlled installer/remover of electrical equipment.

The installer/remover of electrical equipment can be a high lift racking tool. Embodiments of the controller for use with racking equipment can also be referred to herein as "RSO IV".

The remote switch operator, or "RSO", has a housing, which can have a lid and a body. The lid can be hinged to the body or removable from the body, or both hinged and removable from the body. The housing can have reinforcing ribs on the outside of the lid, on the body, or on both the lid and the body.

The housing can be an explosion resistant housing and can be made from an explosion proof plastic.

The housing can be a waterproof design or a water resistant housing. The housing can be made of polyvinyl chloride, a blend of polypropylene/polyethylene, polyamide, or another material. In one or more embodiments, the housing can be formed of a material that has an operation temperature of up to about 145 degrees Fahrenheit.

In one or more embodiments, the lid can be latched to the body, such as by using a one or two part latch, thereby providing a secured engagement between the lid and the body.

The housing can be generally rectangular. In one or more embodiments, the housing can have a height from about 7 inches to about 25 inches, a depth from about 6 inches to about 12 inches, and a length from about 12 inches to about 24 inches. The housing can be other sizes as well. In one or more embodiments, the housing can be portable and can weigh less than about 50 pounds.

Two face plates can be disposed inside the housing. The two face plates can be disposed within the same plane. One of the two face plates, termed herein "a first face plate" can be disposed in the body and have a first face plate side. The first face plate side and the first face plate can be a one piece construction in an embodiment. It is contemplated that the first face plate side can be connected at about a 90 degree angle to the first face plate.

A first battery can be disposed within the housing beneath the first face plate and adjacent the first face plate side so that an additional space may exists in the housing. The first face plate side forms a wall, containing the battery in its own separate space in the housing.

A second face plate can be disposed within the body. The second face plate can have a second face plate side, which can be integral with the second face plate and connected at about a 90 degree angle to the second face plate opposite the first face plate side. The second face plate side can also form a "wall" in the body of the housing like the first face plate side.

A current controller can be disposed in the first or second face plate. The current controller can be in electrical communication with the one or more batteries in the housing.

The current controller electrically controls power from the one or more batteries. The batteries can be DC batteries. Alternatively, the batteries could be fuel cells run on hydrogen and oxygen.

In one or more embodiments, the current controller can electrically control power from a first battery and second battery in the housing. The batteries are also connected in series to a power on/off switch that is disposed in the first face plate.

The current controller can control power from one or more of the batteries to energize a timer circuit board which can be located beneath the first face plate. The timer circuit board can provide computer instructions and micro-processor elements that can control to shut off power at preset times or based on other conditions, such as increased temperatures. In one or more embodiments, the timer circuit board can be one made by RK Electronics of Mason, Ohio or Eagle Signal of Elizabethtown, N.C.

In one or more embodiments, the total voltage of all batteries of the controller can be from about 24 volts to about 27 volts. For example, each battery can have a voltage of 6 volts, 12 volts, another voltage, or combinations thereof; and the voltages of the batteries can add to from about 24 volts to about 27 volts.

A circuit breaker can be disposed in the first face plate of the controller can connected between one or more of the batteries and the power on/off switch.

At least one relay can be disposed beneath the first face plate within the body. A first and second relay can connect or otherwise be in electrical communication with a timer circuit board and the current controller. The relays would operate like conventional relays.

A power plug can be integral with one of the face plates. The power plug can receive A/C current, such as from a battery charger or a power supply. The power plug can also receive DC current from a battery charger or another DC power supply. In another embodiment, the power plug can be disposed in a side of the housing and directly connect to a charger that communicates power to the batteries.

The battery charger can be in the housing beneath one of the face plates, adjacent one of the batteries, and in electrical communication with each of the batteries. In one or more embodiments, the battery charger can be disposed adjacent and outside of the housing.

A remove momentary push button can be mounted on or through the first face plate. The remove momentary push button provides an actuating signal, such as a first control signal, to the timer circuit board; thereby, enabling the controller to electrically signal and power a remote controlled installer/remover of electrical equipment, such as a racking tool which prevents an operator from being burned during accidental arc flashing. The remove momentary push button can be color coded, such as red.

A second button can be mounted in the first face plate, which is also herein referred to as an install momentary push button. The second button can provide a second control signal to the timer circuit board; thereby enabling the controller to electrically signal and power the remote controlled installer/remover of electrical equipment. The install button transfers a different signal than a remove button, typically causing a motor to rotate a coupling in a direction. For example if install causes a motor to rotate clockwise, then remove signals would cause the motor to rotate a coupling counterclockwise.

A transmitting device or another type of communication means can be used for transmitting the control signals, such as "install" and "remove" from the first face plate to a racking tool or other remote controlled installer/remover of electrical equipment.

A first retractile cord, which can be extendable and retractable, can be secured to a second power plug disposed in the face plate, for providing power to a remote pendant device which would have remote and install, on and off buttons for powering and operating the controller from a distance, of at least several feet to over 20 feet, keeping an operator safe from shocks or other damage caused by being too near the controller that operates motor driven equipment, such as racking tools.

The remote pendant device should have the same buttons as the controller, including but not limited to a remove momentary actuation button, an install momentary actuation button, an on actuation button and an off button. With this design the operator can provide a signal from the remote control, that signals the controller, the controller then signals and powers the equipment, such as the racking tool to operate while the user is a safe distance from the racking tool powered by the controller.

The controller is lightweight, weighing less than 60 pounds. The remote control is contemplated to weigh no more than 10 pounds, enabling both units to be portable, and highly versatile providing current for many functions with this distanced control.

The buttons on the remote pendant device actuate the controller, which in-turn actuates the installer remover of electrical equipment. The use of the remote pendant device lowers the possibility of human harm from arc flashing that may occur when circuit breakers are installed or removed from electrical panels carrying high voltage when the equipment being operated is a racking tool for circuit breakers that are subject to high voltage, for example.

A cord grip can be installed to secure the retractile cord to the housing. The cord grip can fasten the retractile cord to the power plug.

The controller can have a locking means for locking the lid to the body. For example, two metal loop holders can be fastened to the lid and/or the body enabling a lock to slide between the loops and to securely lock the lid to the body creating a waterproof housing that could survive a deluge of water.

The means for transmitting can be a communication plug that is mounted to the first face plate. The communication plug can engage a cable for communicating the first and second control signals. The communication plug can communicate power from the first and/or the second battery and control signals from the current controller to the installer/remover of electrical equipment.

A radio transmitter/receiver can be connected to a side of one of the face plates in the housing and contained under the lid in the body but not under either of the face plates.

The radio transmitter/receiver can connect directly to one or all of the batteries and provide a wireless signal that can operate various buttons on racking equipment.

The radio transmitter/receiver causes the first and second control signals as well as the power to be transmitted from the controller to the installer/remover of electrical equipment using the wireless signal.

In one or more embodiments, the controller transmits a signal from a distance less than a foot about 200 feet. For example, the signal can be transmitted from a distance of about 190 feet, or from a distance of a few inches.

In one or more embodiments, the controller can weigh from about 5 pounds to about 50 pounds. The controller is moveable, portable, and even water resistant when the lid is latched and locked down.

In one or more embodiments, the housing is constructed with support ribs on the outside to assist in the resistance of deformation upon an impact. The support ribs can be made from the same material as the body and molded at the same time as the body. The support ribs can be 1 rib to 6 ribs on each side of the housing and the lid, or just on 1 side of the housing or just on the lid. Each support rib provides structural support to the body, to resist deformation on impact, such as a car driving into it accidently, or a forklift backing into the controller accidently on a floor of a electrical/mechanicals room.

A pressure relief valve can be used and disposed through the body to allow heated air to escape if the batteries or electronics in the housing heat up the air in the housing, to prevent possible explosions or other damage.

In one or more embodiments, the first retractile cord can control the installer/remover of electrical equipment using signals that can provide a first polarity to cause the installer/remover of electrical equipment to perform a forward action or a first rotation, such as a clockwise rotation to install a circuit breaker or other electrical equipment. The first retractile cord can then send a second or reverse polarity signal to cause the installer/remover of electrical equipment to perform a reverse action or a second rotation, such as counterclockwise rotation, to remove equipment.

The remote switch operator can provide a DC power supply to an electrical gadget such as a racking tool The DC power of the RSO can be charged from a charger or inverter which can be external to the housing and can engage the housing with a DC plug.

Turning now to the Figures, FIG. 1 shows a controller 10. The controller 10 can be removably mounted to an installer/remover of electrical equipment 8, here shown as a high low racking tool for circuit breakers, such as those made by CBS Arcsafe, Inc. of Denton, Tex.

The installer/remover of electrical equipment 8 is shown having two actuators 6a and 6b for use in installing and removing electrical equipment. Embodiments can include more or less than two actuators.

Figure 2:
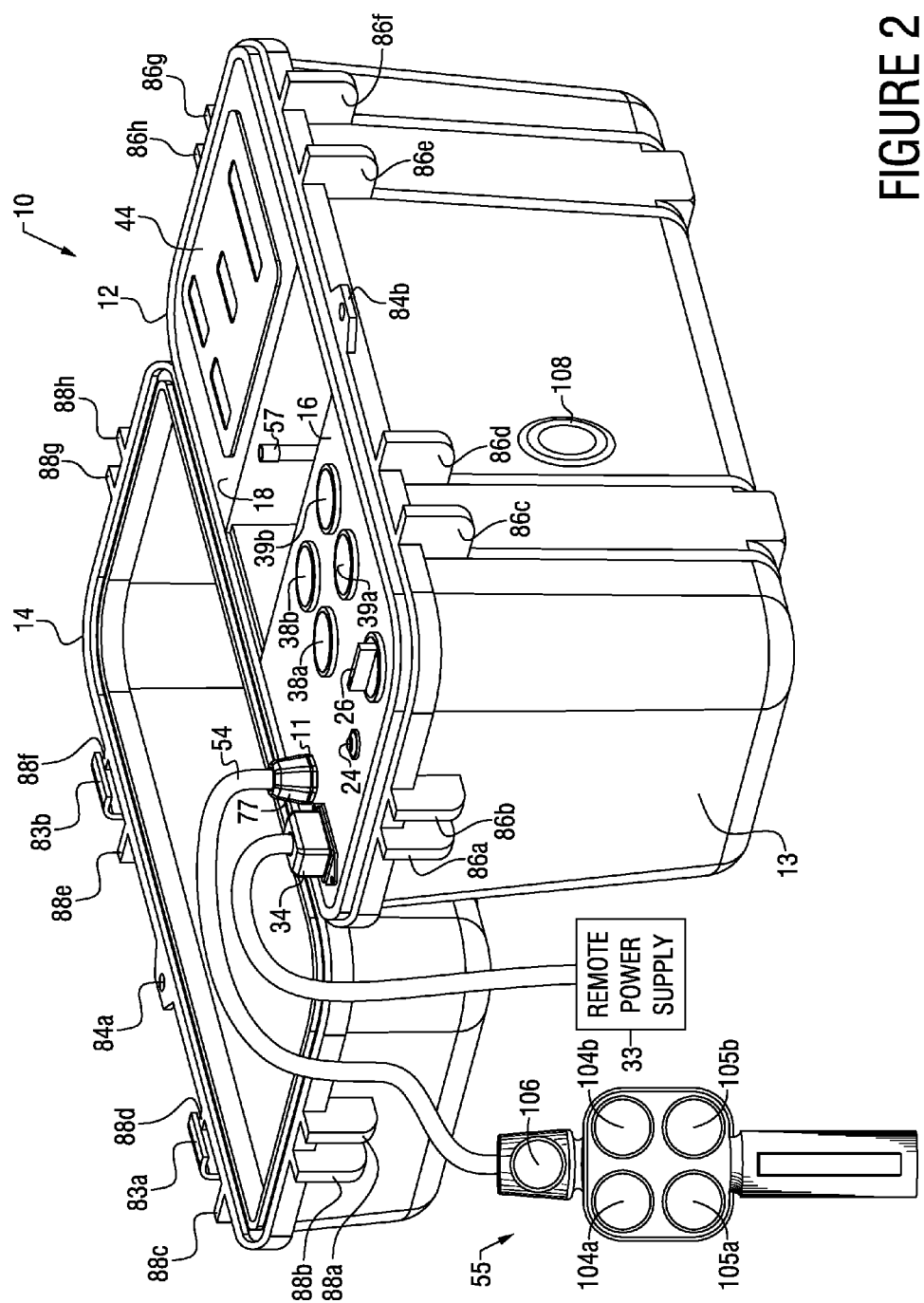
FIG. 2 is a detailed view of the remote switch operator controller of FIG. 1.

FIG. 2 shows the controller 10 having a housing body 12 hinged to a lid 14. A power plug 34 can be disposed or installed in a first face plate 16. In one or more embodiments, the power plug 34 can be disposed or installed through a side of a body 13. The power plug 34 can engage a remote power supply 33.

The housing body 12 can further contain a second face plate 18, which can be disposed adjacent the first face plate 16.

The lid 14 can have latches 83a and 83b for latching the lid to the housing body 12. Lid reinforcing ribs 88a, 88b, 88c, 88d, 88e, 88f, 88g, and 88h can be formed in the lid 14.

Body reinforcing ribs 86a, 86b, 86c, 86d, 86e, 86f, 86g, and 86h can be formed on the housing body 12 which can engage the lid reinforcing ribs 88a, 88b, 88c, 88d, 88e, 88f, 88g, and 88h when the lid 14 is closed over the housing body.

Locking means 84a and 84b can be disposed on the lid 14 and the housing body 12 for securely locking the lid 14 to the housing body 12.

A space can be disposed between the two face plates 16 and 18. A radio transmitter/receiver 57 can be disposed in the space between the two face plates and can transmit control signals.

A pressure relieve valve 108 can be disposed through the housing body 12 for allowing the release of gasses such as heated air from the closeable housing.

A current controller 44 can be disposed in the second face plate 18. A circuit breaker 24, remove momentary push buttons 38a and 38b, install momentary push buttons 39a and 39b, and a power on/off switch 26 can be disposed in the first face plate 16.

The remove momentary push button 38a and the install momentary push button 39a can each send control signals to an actuator, such as the actuator 6a shown in Figure 1. Upon pushing the remove momentary push button 38a, the controller can send a control signal to the actuator 6a to perform a removal action on electrical equipment, such as a reverse action, a pulling force, or a reverse rotation. Upon pushing the install momentary push button 39a, the controller can send a control signal to the actuator 6a to perform an install action on electrical equipment, such as a forward action, a pushing force, or a forward rotation.

The remove momentary push button 38b and the install momentary push button 39b can each send control signals to an actuator, such as the actuator 6b shown in FIG. 1. Upon pushing the remove momentary push button 38b, the controller can send a control signal to the actuator 6b to perform a removal action on electrical equipment, such as a reverse action, a pulling force, or a reverse rotation. Upon pushing the install momentary push button 39b, the controller can send a control signal to the actuator 6b to perform an install action on electrical equipment, such as a forward action, a pushing force, or a forward rotation.

A communication plug 11 can be mounted to the first face plate 16 and can connect to a retractile cord 54 that can engage a remote pendant device 55. A cord grip 77 can engage the retractile cord 54.

The remote pendant device 55 can be held by an operator at a distance from the controller 10. Buttons can be disposed on the remote pendant device that can transmit control signals. The remote pendant device can have remove momentary actuation buttons 104a and 104b, install momentary actuation buttons 105a and 105b, and an on/off actuation button 106, which can each send control or power signals to the corresponding buttons on the controller 10.

The remove momentary actuation button 104a and can send control or power signals to the remove momentary push button 38a for controlling or powering the actuator 6a, while the install momentary actuation button 105a can send control or power signals to the install momentary push button 39a for controlling the actuator 6a.

The remove momentary actuation button 104b and can send control or power signals to the remove momentary push button 38b for controlling or powering the actuator 6b, while the install momentary actuation button 105b can send control or power signals to the install momentary push button 39b for controlling the actuator 6b.

The on/off actuation button 106 can send control or power signals to the power on/off switch 26 for controlling the controller 10.

Figure 3:
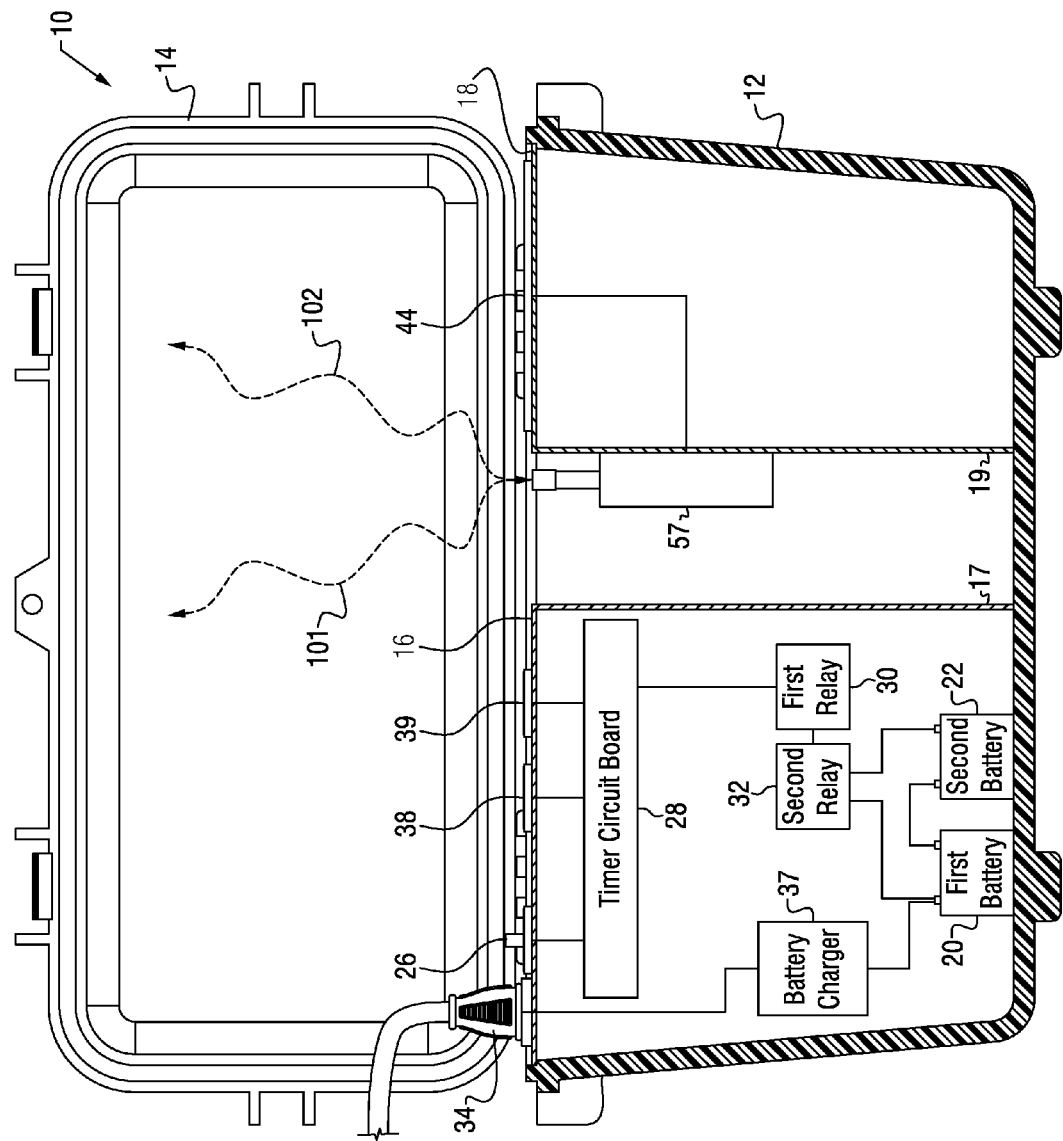
FIG. 3 is a cut view of the remote switch operator controller of FIG. 1.

FIG. 3 shows a side cut view of the controller 10. The first face plate 16 is shown in an L-shaped configuration with a first face plate side 17. The second face plate 18 is shown in an L-shaped configuration with a second face plate side 19.

The radio transmitter/receiver 57 can transmit first control signal 101 and second control signal 102. In embodiments, the radio transmitter/receiver 57 can connect to a wireless radio controller on the second face plate (not shown). The radio receiver/transmitter 57 can be disposed outside or inside the housing body 12.

The first and second control signals 101 and 102 can be transmitted from the controller 10 through a means for transmitting, which can be the radio transmitter/receiver 57, a cable, or a communication wire from a plug in the first face plate that can communicate with a timer circuit board 28.

The first face plate 16, shown in profile, can have the power on/off switch 26, remote momentary push button 38, install momentary push button 39, and power plug 34 disposed through the first face plate 16.

Each push button 26, 38, and 39 can engage through the first face plate 16 and can be in electrical communication with the timer circuit board 28, which can in-turn be in electrical communication with a first relay 30 and a second relay 32. In one or more embodiments, more or less than two relays can be used.

A first battery 20 and a second battery 22 can be in electrical communication with the timer circuit board 28. The second battery 22 can be connected in series with the first battery 20. A battery charger 37 can engage the power plug 34 and can be in electrical communication with the timer circuit board 28. The current controller 44 and the lid 14 are also depicted.

While these embodiments have been described with emphasis on the embodiments, it should be understood that within the scope of the appended claims, the embodiments might be practiced other than as specifically described herein.

What is claimed is:

1. A controller for remotely controlling an installer/remover of electrical equipment, the controller comprising:
   a. a closeable housing having a body and a lid for engaging the body;
   b. a first face plate disposed within the body, wherein the first face plate further has a first face plate side;
   c. a first battery, wherein the first battery is disposed within the closeable housing and is contained within the body using the first face plate side;
   d. a second face plate disposed within the body, wherein the second face plate has a second face plate side, and wherein the second face plate side is disposed opposite the first face plate side;
   e. a current controller disposed in the second face plate, wherein the current controller electrically controls power from the first battery to a power on/off switch disposed in the first face plate, and wherein the current controller controls power from the first battery to energize a timer circuit board disposed beneath the first face plate;
   f. a circuit breaker disposed in the first face plate, wherein the circuit breaker is in electrical communication between the first battery and the power on/off switch;
   g. a first relay in electrical communication with a second relay disposed beneath the first face plate in the body, wherein the first relay and the second relay connect between the timer circuit board and the current controller;
   h. a power plug disposed in the first face plate for receiving current from a battery charger or from a power supply, wherein the power plug is in electrical communication with the first battery;
   i. a remove momentary push button disposed on the first face plate to provide a first control signal to the timer circuit board enabling the controller to electrically signal and power the installer/remover of electrical equipment;
   j. an install momentary push button disposed on the first face plate to provide a second control signal to the timer circuit board enabling the controller to electrically signal and power the installer/remover of electrical equipment; and
   k. a transmitting device for transmitting the first control signal and second control signal from the first face plate to the installer/remover of electrical equipment.

2. The controller of claim 1, further comprising a retractile cord connecting the power plug to a remote pendant device for remotely operating the controller.

3. The controller of claim 2, wherein the remote pendant device comprises:
   a. a remove momentary actuation button to cause operation of the installer/remover of electrical equipment to remove electrical equipment;
   b. an install momentary actuation button to cause operation of the installer/remover of electrical equipment to install electrical equipment; and
   c. an on/off actuation button for remotely actuating the controller, wherein the controller actuates the installer/remover of electrical equipment.

4. The controller of claim 2, wherein the retractile cord attaches to a cord grip that fastens the retractile cord to the power plug.

5. The controller of claim 1, further comprising a second battery disposed beneath the first face plate and connected in series with the first battery.

6. The controller of claim 1, wherein the closeable housing is an explosion resistant housing.

7. The controller of claim 1, further comprising a locking means for locking the lid.

8. The controller of claim 1, further comprising at least one latch to secure the lid to the body.

9. The controller of claim 1, wherein the transmitting device is a communication plug disposed on the first face plate that engages a cable for communicating the first and second control signals and power from first battery and the current controller to the installer/remover of electrical equipment.

10. The controller of claim 1, wherein the transmitting device is a radio transmitter/receiver connected to one of the sides of one of the face plates, wherein the radio transmitter/receiver is powered by the first battery and communicates the first and second control signals using a wireless signal.

11. The controller of claim 10, wherein the radio transmitter/receiver transmits the first and second control signals a distance from a one foot to sixty feet.

12. The controller of claim 1, wherein the controller weighs from five pounds to fifty pounds.

13. The controller of claim 1, wherein the controller is moveable, portable, water resistant, or combinations thereof.

14. The controller of claim 1, wherein the lid and the body further comprise a plurality of support ribs.

15. The controller of claim 1, further comprising a pressure relief valve disposed through the body.

16. A controller for remotely controlling an installer/remover of electrical equipment, the controller comprising:
   a. a housing having a body and a lid;
   b. a first plate with a first side disposed within the body;
   c. a first battery disposed within the housing;
   d. a second plate with a second side disposed within the body opposite the first plate;
   e. a current controller disposed through the second plate, wherein the current controller electrically controls power from the first battery to a power on/off switch disposed in the first plate, further wherein the current controller controls power from the first battery to energize a timer circuit board disposed within the housing;
   f. a circuit breaker disposed through the first plate, wherein the circuit breaker is in electrical communication between the first battery and the power on/off switch;
   g. a first relay in electrical communication with a second relay disposed within the housing, wherein the first and second relays connect between the timer circuit board and the current controller;
   h. a power plug disposed through the first plate for receiving current from a power supply, wherein the power plug is in electrical communication with the first battery;
   i. a remove button disposed on the first plate to provide a first control signal to the timer circuit board, enabling the controller to electrically signal and power the installer/remover of electrical equipment;
   j. an install button disposed on the first plate to provide a second control signal to the timer circuit board, enabling the controller to electrically signal and power the installer/remover of electrical equipment; and
   k. transmitting device for transmitting the first control signal and second control signal from the first plate to the installer/remover of electrical equipment.

17. The controller of claim 16, further comprising a pressure relief valve disposed through the body.

18. A controller for remotely controlling an installer/remover of electrical equipment, the controller comprising:
 a. an explosion resistant and water resistant housing having a body and a lid;
 b. a first plate disposed within the body;
 c. a first battery disposed within the explosion resistant and water resistant housing;
 d. a second plate disposed within the body opposite the first plate;
 e. a current controller disposed through the second plate, wherein the current controller electrically controls power from the first battery to a power on/off switch disposed in the first plate, further wherein the current controller controls power from the first battery to energize a timer circuit board disposed within the explosion resistant and water resistant housing;
 f. a circuit breaker disposed through the first plate, wherein the circuit breaker is in electrical communication between the first battery and the power on/off switch;
 g. at least one relay disposed within the explosion resistant and water resistant housing, wherein the at least one relay connects between the timer circuit board and the current controller;
 h. a power plug disposed through the first plate for receiving current from a power supply, wherein the power plug is in electrical communication with the first battery;
 i. a remove button disposed on the first plate to provide a first control signal to the timer circuit board, enabling the controller to electrically signal and power the installer/remover of electrical equipment;
 j. an install button disposed on the first plate to provide a second control signal to the timer circuit board, enabling the controller to electrically signal and power the installer/remover of electrical equipment; and
 k. a transmitting device for transmitting the first control signal and second control signal from the first plate to the installer/remover of electrical equipment.

19. The controller of claim 18, further comprising at least one latch to secure the lid to the body.

20. The controller of claim 18, further comprising a second battery disposed beneath the first face plate and connected in series with the first battery.

* * * * *